United States Patent [19]

Iida et al.

[11] 4,257,834
[45] Mar. 24, 1981

[54] PROCESS FOR PRODUCING A SHEET HAVING CHIP DESIGN

[75] Inventors: Kosuke Iida; Tadayuki Morikawa; Mitsuo Aoki; Isamu Ueda; Takashi Butsuda; Osami Tsuda, all of Osaka, Japan

[73] Assignee: Takiron Co., Ltd., Osaka, Japan

[21] Appl. No.: 27,324

[22] Filed: Apr. 5, 1979

[30] Foreign Application Priority Data

Apr. 11, 1978 [JP] Japan .................................. 53-42873

[51] Int. Cl.³ ............................ B29J 5/00; B32B 5/16
[52] U.S. Cl. ............................ 156/73.6; 144/309 D; 144/309 P; 156/192; 156/209; 156/250; 156/272; 156/289; 156/304.1; 156/305; 264/70; 264/109; 264/111; 428/323; 428/325; 428/326; 428/327; 428/328; 428/357
[58] Field of Search ............ 156/62.2, 73.6, 209, 156/272, 304, 305, 192, 250, 289; 264/70, 108, 109, 112, 111; 428/105, 114, 323, 325, 326, 327, 328, 357; 144/309 D, 309 P

[56] References Cited

U.S. PATENT DOCUMENTS

| 3,594,245 | 7/1971 | Hayes | 156/62.2 |
| 3,963,400 | 6/1976 | Urmanov | 156/62.2 X |

FOREIGN PATENT DOCUMENTS 51-112873  5/1976  Japan .

Primary Examiner—William A. Powell
Assistant Examiner—Robert A. Dawson
Attorney, Agent, or Firm—Sughrue, Rothwell, Mion, Zinn and Macpeak

[57] ABSTRACT

A process for manufacturing a sheet having a chip-like design composed of a plurality of chips densely aligned in a plane without overlapping and a solidified binder uniformly filling the interstices among the chips and firmly and integrally bonding the chips to one another in sheet form. The sheet is useful as a floor material, wall material, and the like.

23 Claims, 3 Drawing Figures

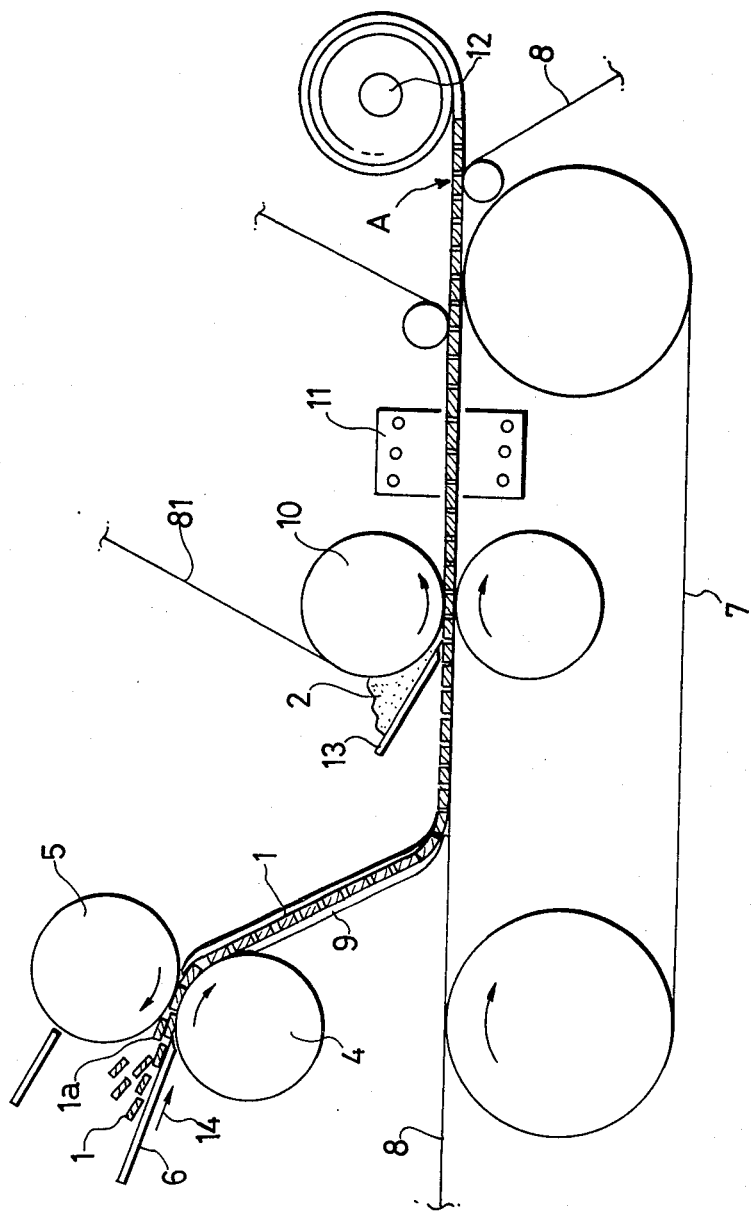

PROCESS FOR PRODUCING A SHEET HAVING CHIP DESIGN

BACKGROUND OF THE INVENTION

1. Field of the Invention

This invention relates to a process for producing a sheet having a beautiful chip-like pattern which is widely used as a floor material or the like.

2. Discussion of the Prior Art

According to conventional techniques, sheets of this nature are generally produced by a method which comprises spreading chips onto a matrix sheet and pressing the sheet under heat using a press or rolls. When a press is used the sheets are difficult to continuously produce and the efficiency of production is reduced. When rolls are used continuous production is possible but clear and beautiful products of high market value are difficult to obtain because the chips tend to partially overlap one another, or the chips are greatly deformed resulting in a chip-pattern having a vague contour, or drifting of the chip pattern occurs in the extrusion direction of the rolls.

In an attempt to overcome these disadvantages, a method for producing a chip-embedded sheet has recently been reported which comprises continuously feeding chips onto the surface of a matrix sheet using a microvibrating chip feeding plate in such a manner that the chips do not overlap one another, and consolidating the chips and sheet under heat and pressure to embed the chips in the matrix sheet (see Japanese patent application (OPI) No. 112873/76). (The term "OPI" as used herein refers to a "published unexamined Japanese patent application".) This method has been successful to some extent in solving the aforesaid problems, but there are still some drawbacks to be overcome.

One problem which occurs when embedding chips in the matrix sheet in the above manner is that a sheet in which the chips penetrate all the way through the sheet in its thickness direction cannot be obtained even when the embedding pressure is considerably high. Whether the chips penetrate through the sheet in its thickness direction greatly affects the service life of the sheet used as a floor material. For example, in a sheet obtained by the above method in which the chips are embedded halfway, when the sheet is worn down to the embedded depth, the chip pattern disappears. Thus, as compared with a sheet in which the chips penetrate from one surface of the sheet to the other whose chip-pattern does not disappear, the service life of the sheet having a beautiful chip-like pattern is shortened considerably. This difference is particularly noticeable when local wear tends to occur on the sheet.

Another problem with the aforementioned method is that considerably rigorous control must be exercised over various conditions during manufacture including the amount of chips fed, the amount of the matrix sheet fed, and the chip embedding pressure. For example, when the balance between the amounts of the chips and the matrix sheet at the contact point of press rolls is lost and the amount of the matrix sheet becomes excessive, the spaces between the chips which have been forced into the sheet increases and the resulting sheet having a chip-like pattern has a low chip filling density. On the other hand, when the amount of the chips becomes excessive, the chips overlap and the chips are compressed by a high embedding pressure and the contours of the chips become vague. Thus, in order to obtain products of uniform high quality continuously, very rigorous control is necessary. In practice, it is very difficult to constantly exercise this control and some variations in product must be accepted.

Still another problem is that it is difficult to embed chips in a compact dense state. Since the chips slide as they are fed onto the matrix sheet by means of a microvibrating chip feeding plate (set at an inclination angle of 5°), the chips can be embedded in compact state to some extent when the feed rate (velocity) of the matrix sheet is low. However, as the feed rate of the matrix sheet increases, the feeding of the chips tends to be retarded and considerable spaces appear in the chip feeding direction. Accordingly, when it is desired to obtain a sheet having chips somewhat densely embedded, it must naturally be done at the sacrifice of a reduction in the efficiency of production.

The purpose of the present invention is to solve all of the aforesaid problems, and to provide a process for continuously producing with good efficiency a sheet having a chip-like pattern in which the chips are densely aligned in a plane without overlapping and substantially penetrate through the sheet in its thickness direction, and in this state, they are bonded integrally in sheet form by a binder, such that the chips have a clear contour and the sheet has a long service life.

SUMMARY OF THE INVENTION

A principal object of the present invention is to provide a process for producing a sheet having a chip-like pattern, said sheet being composed of a plurality of chips densely aligned in a plane without overlapping one another and a solidified binder uniformly filling the interstices among the chips, the chips being integrally bonded to one another in sheet form by the binder while penetrating or substantially penetrating, through the sheet in its thickness direction.

These and other objects of the present invention are attained by a process which comprises feeding a plurality of chips while densely aligning the chips in a plane such that they do not overlap one another by means of a chip feed roll and an aligning roll, said aligning roll rotating in a direction opposite to the direction at which the chips are fed and said feed roll rotating in the same direction as the chips are fed, the aligning roll being juxtaposed with the feed roll with the clearance between the feed roll and the aligning roll being slightly larger than the thickness of each chip; filling the interstices among the chips with a binder by a supply means capable of thickness adjustment so that the chips penetrate, or substantially penetrate, through the sheet in its thickness direction; and solidifying the binder.

BRIEF DESCRIPTION OF THE DRAWINGS

FIG. 3 is an illustration of the process of this invention.

DETAILED DESCRIPTION OF THE INVENTION

Figure 1:
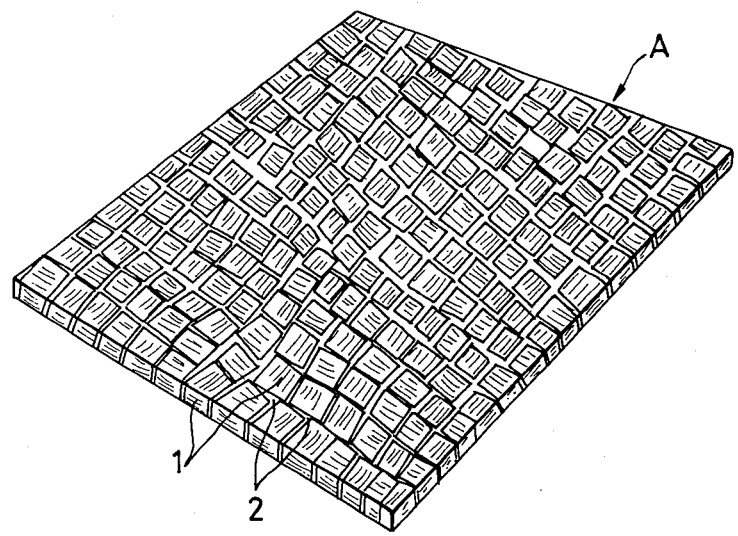
FIG. 1 is a perspective view of a sheet having a chip-like pattern prepared in accordance with the present invention.
Figure 2:
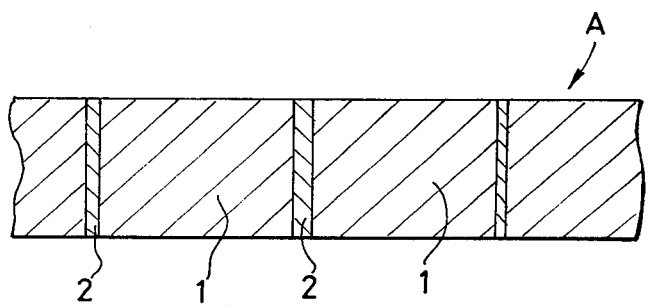
FIG. 2 is a cross-section of an enlarged portion of the sheet.

Referring to FIGS. 1 and 2, the sheet having a chip-like pattern consists of a number of chips 1 densely aligned in a plane without overlapping in a solidified binder 2 filling the interstices among the chips 1. The chips 1 are bonded integrally in sheet form by the binder 2 while the chips 1 penetrate, or substantially penetrate, through the sheet in its thickness direction. The chips 1 are the constituent units of the sheet and simultaneously function as pattern elements. The sheet can be directly used as a floor material or a wall material. If desired, it may be reinforced by laminating a backing material such as asbestos paper, paper, nonwoven fabrics, woven fabrics, synthetic resin films, etc., onto its one surface, or laminating a surface protecting film of synthetic resin on one or both of its surfaces, or by embossing one or both surfaces to impart a texture to the surface(s), thereby satisfying a variety of uses.

The process of producing the sheet is hereinafter explained by reference to the embodiment shown in FIG. 3. In this embodiment, chips 1 on a chip receiving plate 6 are fed by a feed roll 4 and an aligning roll 5 to the surface of a substrate 8 carried on a conveyor belt 7. During feeding, the chips are densely aligned in a plane so that they do not overlap one another. The aligning roll 5 has a higher coefficient of friction than the feed roll 4 and is, for example, a sand paper roll. The coefficient of friction of the aligning roll 5 is generally determined by a combination of an aligning roll and chips and by other factors such as rotation speeds of the aligning roll 5 and the feed roll 4 and the like. An aligning roll having a coefficient of static friction between the aligning roll and the chips of about 0.5 to about 1.4 (at a pressure of about 5 to 8 g/cm$^2$) is preferably used in this invention. The aligning roll 5 is juxtaposed with the feed roll 4 with the clearance between the aligning roll and the feed roll being slightly larger than the thickness of each chip, and rotates in a direction opposite to the direction at which the chips are fed. The clearance between the aligning roll and the feed roll is about 1.1 to 1.9 times the thickness of the chips. The peripheral speed of the aligning roll 5 is about 4 to 40 m/min. By its high surface friction and its rotation in the opposite direction of the chip feed, the aligning roll 5 forces back those chips 1a which are about to be fed in an overlapping state, and aligns the chips 1 in a single plane layer without overlapping. In the meantime, the feed roll 4 rotates in the chip feeding direction (as indicated by the arrow 14) at a higher speed than the speed at which the aligned chips 1 move after passing the aligning and feed rolls. The peripheral speed of the feed roll 4 is about 6 to 60 m/min and the feed speed of the chips onto the substrate 8 is about 3 to 7 m/min. Usually, the peripheral speed of the feed roll 4 is about 2 to 10 times the feed speed of the chips on the substrate 8. By the frictional force generated between the feed roll 4 and the chips 1, the chips 1 are always drawn in the feeding direction and are fed without delay onto the substrate 8 while being densely aligned. If at this time, a guide plate 9 is vibrated in parallel to the axis of the feed roll 4, or the feed roll 4 is vibrated to impart vibration in the axial direction, denser alignment of the chips becomes possible. In the drawing, the chips 1 are fed onto the substrate 8. However, when, for example, a steel belt having good releasability is used as the conveyor belt 7, it is of course possible to feed the chips 1 directly onto the conveyor belt 7. The speed of the conveyor belt 7 (i.e., the substrate 8) is about 3 to 7 m/min.

The chips 1 so aligned and fed are then submitted to a binder filling step. The binder 2 supplied by a suitable supply means capable of thickness adjustment and uniformly filling the interstices among the chips 1 without forming a surface coating, or with the formation of only a very thin surface coating, for example, a pair of thickness adjusting rolls 10 shown in the drawing. Since the filling is effected substantially without pressure, no deformation of the chips 1 occurs. In supplying the binder 2 using the thickness adjusting roll 10, it is desirable to prevent roping of the binder 2 after passage through thickness adjusting rolls 10 using an auxiliary member such as belt 81.

The filled binder 2 is then solidified to form an integral sheet-like structure in which the chips 1 penetrate, or substantially penetrate, through the sheet structure in its thickness direction. Solidification can be performed by applying heat from a heating device 11 as shown when the binder contains a heat-processable main ingredient such as a paste resin, but is not limited to heating alone. For example, when using a binder containing a curing agent which acts effectively at room temperature, or a curing agent which acts effectively by application of ultraviolet light, spontaneous solidification is performed by allowing enough time to elapse until the final sheet wind-up step, or by means of an ultraviolet light irradiating device. In the case of solidification by heating which is most general, the heating temperature is optionally determined based on the material selected for the chips 1 or the binder 2. Usually, temperatures of about 60° to 200° C. are employed.

After solidification, the substrate 8 or the auxiliary member 81 is removed from the resulting sheet A. The sheet A is wound up on a wind-up roll 12 either as such or after having been cooled by a conventional cooling means, or after being subjected to a suitable heat processing, or being annealed. When the sheet A has poor flexibility, it may be cut to suitable sizes and stacked without wind-up. When a sheet having a chip-like pattern as shown in FIGS. 1 and 2 is to be obtained by removing the substrate 8 or the auxiliary member 81 before wind-up, a material having good peelability such as a Flow Glass Belt (Chuko Kasei Kogyo K.K.), a mold releasing paper or a rubber belt is used as the substrate sheet 8 or the auxiliary member 81. When the aforesaid backing material or surface protective film is used instead of the substrate 8 or the auxiliary member 81 and the sheet is wound up without removing it, various types of products can be obtained depending upon the combination of these materials. If at this time, the thickness adjusting roll 10 is controlled so that a very thin surface coating of binder is formed, the adhesion between the backing material and the chip-patterned sheet becomes very good. When an embossed sheet is desired, embossing is performed by embossing rolls, etc., during the solidification, or after softening the solidified structure.

The sheet of this invention is continuously produced with good efficiency at a speed of about 3 to 7 meters per minute by the method described above. Since the process of manufacture does not contain any step which requires high pressures, the chips 1 retain their original clear contours, and no drifting occurs which makes the chip contours vague. In the resulting sheet, the chips 1 are densely aligned without overlapping by means of the feed roll 4 rotating at a higher rotating speed than the feed speed of the chips in the subsequent step and the aligning roll 5.

The proportion of the chips 1 in the sheet differs according to the shape of the chips, but usually reaches as high as about 70 to 90% by volume based on the entire volume of the sheet. In order to increase the density of the chips further, chips 1 having a plane shape such as a triangle, rectangle, hexagon or circle having good alignability are preferred. Chips of other configurations can of course also be used.

The material for the chips 1 is not particularly limited. By properly choosing the binder 2, not only synthetic resin chips which have been frequently used in sheets of this type, but also inorganic chips such as metallic chips, ceramic chips or stone chips or wooden chips can be used. From the standpoint of design effect, synthetic resin chips with a design pattern, and metallic chips having a superior metallic luster are conveniently used.

When the chips 1 are excessively large, the area of contact of the chips with the binder 2 decreases, and this is likely to cause a decrease in the strength of the sheet. Accordingly, in the production of sheets for use as a floor material or a wall material, it is desirable to use chips having a thickness of about 1 to 5 mm, a long length of about 3 to 50 mm and a short length of about 3 mm or more.

The binder 2 can be selected from various materials depending on the material which is used for the chips 1. Typically, when the chips 1 are primarily a thermoplastic resin material, such as polyvinyl chloride, binders containing ordinary paste resins as a main ingredient can be used. When the chips 1 are made of inorganic material or wood, heat-curable or room temperature-curable binders composed principally of an epoxy resin, urethane resin, etc., can be used. When the sheet A is cut into flat plates or tiles without wind-up, cement, gypsum, etc., can be used as a binder for ceramic chips.

In the sheet of this invention, the proportion of relatively inexpensive chips (in the case of synthetic resin chips, the cost can be reduced by adding a filler) is large, and the proportion of relatively expensive binder (resin binders are especially costly because a filler cannot be added in a large amount) is small. Thus, as a whole, the sheet can be produced at a low cost. Furthermore, since the chips 1 penetrate, or substantially penetrate, through the sheet in its thickness direction, the chip-like pattern does not disappear until the entire sheet is worn out. Therefore, the sheet of the invention can withstand use over long periods of time. As the design formed by the chips 1 has clear contours, and the chips are densely aligned without overlapping by a combination of the feed roll 4 and the aligning roll 5, it is far better than those of conventional sheets, and its market value is greatly increased. In addition, rigorous control of the conditions as required by prior art techniques is not required in the production of the sheet of this invention, and the rate of production can be as high as about 3 to 7 meters per minute. The manufacturing apparatus is simple and can be easily operated.

The following Examples illustrate the present invention in more detail, however, they are not intended to be construed as limiting.

EXAMPLE 1

A composition of the formulation shown in Table 1 below was formed into a chip sheet (thickness 2.5 mm) having a flowing design pattern by roll molding. The chip sheet was cut to form rectangular polyvinyl chloride chips having a size of 5 mm×5 mm×2.5 mm.

TABLE 1

|  | parts by weight |
| --- | --- |
| PVC (103 EP, a product of Nippon Zeon Co., Ltd.) | 100 |
| Calcium carbonate (SL800, a product of Takehara Kagaku Kogyo K.K.) | 250 |
| Plasticizer (DOP) | 45 |
| Stabilizer (2000E, a product of Nitto Kasei K.K.) | 3 |
| Pigment | 1 |

A light-colored transparent binder of the formulation shown in Table 2 was prepared.

TABLE 2

|  | parts by weight |
| --- | --- |
| Paste resin (135J, a prooduct of Nippon Zeon Co., Ltd.) | 100 |
| Plasticizer (DOP) | 55 |
| Stabilizer (AG111, a product of Adeka-Argus Chemical Co., Ltd.) | 3 |
| Pigment | 1 |

Using an apparatus built in accordance with FIG. 3, the polyvinyl chloride chips and the binder were charged respectively into chip receiving plate 6 and binder receiving plate 13. A Flow Glass Belt (thickness 0.3 mm) was used as substrate 8, and carried on a conveyor belt 7 at a speed of 4 m/min. In the meantime, the feed roll 4 was rotated at a speed of 14 m/min in the same direction as the chip speed direction. Aligning roll 5 composed of a sand paper roll juxtaposed with the feed roll 4, with the clearance between the rolls being 3 mm, was rotated at a speed of 10 m/min in the direction opposite to the chip feed direction. Thus, the polyvinyl chloride chips were fed in good alignment onto the substrate 8. At this time, guide plate 9 was microvibrated in a direction parallel to the axis of the feed roll 4. The chips fed onto the substrate 8 were in a plane and very densely aligned. The chips were passed through the clearance between the thickness adjusting rolls 10 set to adjust the thickness to 2.5 mm, and the binder was filled in the interstices among the chips so as not to form a surface coating. Subsequently, the matrix sheet was transferred to heating device 11, and heated at 160° C. for 3 minutes to solidify the binder and bond the chips integrally in sheet form. Then, the substrate 8 was peeled off, and the sheet was cooled and wound up by wind-up roll 12.

In the resulting sheet having a chip-like pattern, the chips were in a dense alignment without overlapping (the proportion of the chips in the sheet was 83% by volume), and firmly bonded by a binder to form an integral sheet while penetrating through the sheet in its thickness direction. No deformation of the chips nor vagueness of their contours was seen, and the sheet was very beautiful and clear.

EXAMPLE 2

Instead of the polyvinyl chloride chips used in Example 1, aluminum chips 5×5×2.5 mm in size, were used, and instead of the binder used in Example 1, a room temperature curable binder (Cemedine 1500, a product of Cemedine Co., Ltd. (the ratio of the main ingredient (epoxy resin) to the curing agent (polyamideamine)=1:1)) was used and cured at room temperature. Otherwise, the same procedure as in Example 1 was repeated to form a sheet having a chip-like pattern. In the sheet, the aluminum chips were bonded densely and firmly by the binder to form an integral sheet structure having a very good aluminum luster.

While the invention has been described in detail and with reference to specific embodiments thereof, it will be apparent to one skilled in the art that various changes and modifications can be made therein without departing from the spirit and scope thereof.

What is claimed is:

1. A process for producing a sheet having a chip-like pattern which comprises: feeding a plurality of chips while densely aligning the chips in a plane so that they do not overlap one another by means of a chip feed roll and an aligning roll, said aligning roll rotating in a direction opposite to the direction in which the chips are fed and said feed roll rotating in the same direction in which the chips are fed, said aligning roll and said feed roll being juxtaposed such that the clearance therebetween is slightly larger than the thickness of a chip; filling the interstices among the chips with a binder by a supply means capable of thickness adjustment such that the chips penetrate or substantially penetrate through the sheet in its thickness direction; and solidifying the binder so filled.

2. The process of claim 1, wherein during the feeding of the chips, the chips are vibrated in a direction parallel to the axis of the feed roll.

3. The process of claim 1, wherein the supply means is a pair of juxtaposed thickness adjusting rolls.

4. The process of claim 2, wherein said feed roll is vibrated in its axial direction.

5. The process of claim 1, wherein solidification is accomplished by heating downstream from the supply means.

6. The process of claim 1, wherein said solidification is accomplished by ultraviolet radiation.

7. The process of claim 1, wherein said densely aligned chips are fed to a substrate carried on a conveyor belt.

8. The process of claim 1, wherein said densely aligned chips are fed to the surface of a conveyor belt.

9. The process of claim 1, wherein after filling the interstices among the chips with a binder, said chips and binder are contacted with a means for preventing roping.

10. The process of claim 3, wherein said thickness adjusting rolls are set such that a thin film of binder is formed on the surface of the chips.

11. The process of claim 1, wherein the sheet is embossed.

12. The process of claim 7, wherein said substrate is a backing material.

13. The process of claim 9, wherein said means for preventing roping is a surface protecting film.

14. The process of claim 1, wherein after solidification said sheet is wound up.

15. The process of claim 1, wherein after solidification the sheet is cut to size and stacked.

16. The process of claim 1, wherein said chips are synthetic resin chips.

17. The process of claim 1, wherein said chips are inorganic chips.

18. The process of claim 17, wherein said inorganic chips are metallic chips, ceramic chips or stone chips.

19. The process of claim 1, wherein said chips are wooden chips.

20. The process of claim 1, wherein said chips are synthetic resin chips or metallic chips.

21. The process of claim 1, wherein said chips are synthetic resin chips and said binder is a paste resin.

22. The process of claim 1, wherein said chips are inorganic chips and said binder is an epoxy resin or urethane resin.

23. The process of claim 1, wherein said chips are wooden chips and said binder is an epoxy resin or urethane resin.

* * * * *